No. 635,641. Patented Oct. 24, 1899.
A. BECKER.
TAPPING DEVICE FOR CASKS.
(Application filed Feb. 4, 1898.)
(No Model.)
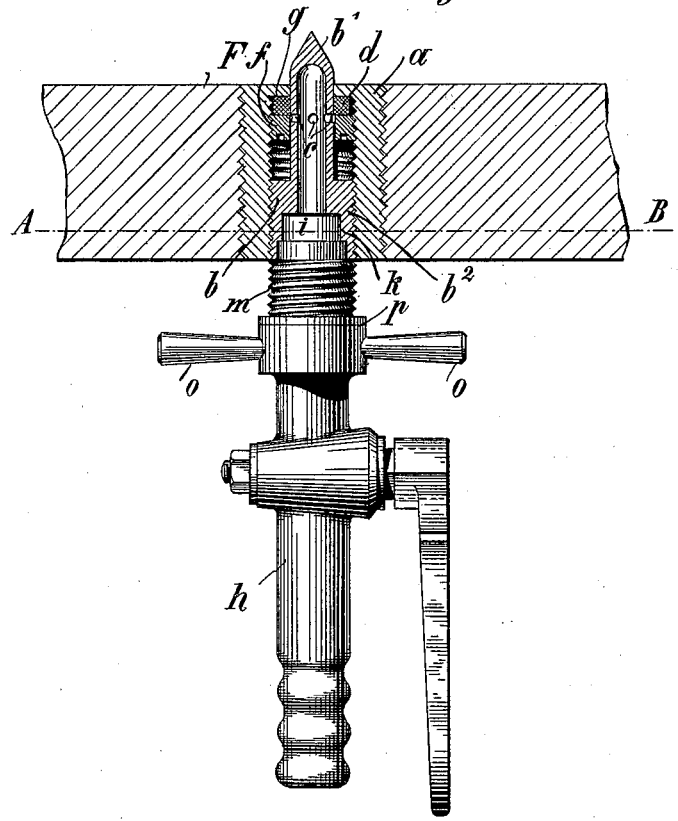
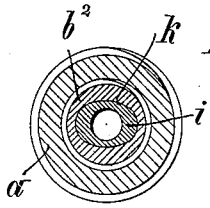
Witnesses
M. V. Bridgood
C. Ewing
Inventor
Anton Becker
By Harry C. Klinger
Atty

UNITED STATES PATENT OFFICE.

ANTON BECKER, OF COLOGNE, GERMANY.

TAPPING DEVICE FOR CASKS.

SPECIFICATION forming part of Letters Patent No. 635,641, dated October 24, 1899.

Application filed February 4, 1898. Serial No. 669,106. (No model.)

*To all whom it may concern:*

Be it known that I, ANTON BECKER, master brewer, of 23 Röhrestrasse, Cologne-on-the-Rhine, in the German Empire, have invented an Improved Tapping Device for Casks, of which the following is a specification, reference being had therein to the accompanying drawings.

The present invention relates to a device for drawing liquid from casks, particularly from casks which are emptied under pressure.

The said device consists of three parts—a tap, a hollow plug entering the barrel, and a casing screwed into the cask and into which the tap and plug are screwed; and my invention is characterized, essentially, by the fact that the casing or sleeve screwed inside the cask acts by means of a rubber ring fixed in the casing to make a perfectly-tight joint with the plug through which the liquid is to be drawn off. Furthermore, the tap carries at its end an oval extension, which is inserted into the enlarged aperture (formed as an oval to correspond with the extension) of the plug, so that by screwing the tap into the casing the plug is screwed up, whereby a connection is effected between the interior of the cask and the tap.

In the accompanying drawings, which illustrate one form my invention may assume, Figure 1 is a view showing the casing and the plug in longitudinal section and the tap in elevation, while Fig. 2 is a cross-sectional view of the casing and plug on the line A B of Fig. 1.

The casing or sleeve $a$ is screwed fast in a cask-stave F. In this casing $a$ is inserted the plug $b$, which can be partially screwed into $a$ and adjusted by means of its screw-thread on $b^2$. It consists of a narrow tubular part $b'$, which is closed at its end and terminates advantageously in a point, and of an enlarged rear part $b^2$, which is externally screw-threaded. The narrow tubular part $b'$ is formed with any desired number of apertures $c$, according to requirement, four being shown in the present case. The liquid is able to flow through the apertures $c$ into the interior of the plug $b$ when the plug is sufficiently screwed up into the casing $a$. The part $b'$ of the plug is guided in and makes a tighter joint with the casing $a$, while its enlargement $b^2$ is screw-threaded externally, so as to screw in the screw-threaded interior of the casing $a$, and thus allows of adjusting the plug to any degree of entry into the cask. The tight joint of the part $b'$ is effected by means of a rubber ring $d$, which bears against the shoulder $g$ of the casing and is pressed firmly up by means of the screw-threaded screw-ring $f$, which screws into the tapped hole in the sleeve $a$ and screws up tightly against the rubber gasket, so as to compress same and cause it to form a tight joint with the plug when the latter is inserted. For this purpose the screw-ring $f$ may be adapted to be engaged by a suitable key of any kind, so that it may be screwed up into place, the said ring having, for example, holes which receive pins on the end of a key.

The screwing of the plug $b$ into the casing $a$ is effected by means of the cock or tap $h$, which is provided for this purpose with an oval extension $i$, which is inserted into a similarly-shaped oval aperture $k$ of the enlarged part $b^2$ of the plug $b$. Connected to the extension $i$ of the cock or tap $h$ is a part $m$, which is provided with screw-threads corresponding to the internal screw-threads of the casing $a$, thus allowing the cock or tap $h$ being also screwed into the casing $a$. If now the extension $i$ of the cock $h$ be inserted into the plug $b$ and then be screwed into the casing $a$, the plug $b$ will also be screwed up and the apertures $c$ will be brought into communication with the interior of the cask, so that the liquid can then flow direct from the interior of the cask through the plug $b$ into the cock $h$. The cock $h$ is of course always closed while it is being inserted, so that no liquid can flow out. The two handles $o$ on the cock serve to facilitate the screwing of the said cock into the sleeve or casing $a$. A rubber disk or washer $p$ is provided to make a tight joint between the cock and the casing $a$.

What I claim, and desire to secure by Letters Patent of the United States, is—

A hermetically closing and drawing-off device for casks, consisting of, in combination, a casing $a$ screwed fast in the cask having a tapped hole and a shoulder $g$, a rubber ring $d$ inside the said casing, a screw-ring screwed into said tapped hole and pressing ring $d$ against shoulder $g$, a plug $b$ with lateral holes $c$ and adapted to screw up in the casing $a$, making a tight joint with the said casing and a cock $h$ adapted to engage with and screw up the plug $b$ to allow of tapping the cask in a perfectly tight jointed manner without waste of liquid, substantially as described.

In witness whereof I hereunto set my hand in presence of two witnesses.

ANTON BECKER.

Witnesses:
K. MINNSKI,
KARL HARTMANN.